(12) United States Patent
Hashida

(10) Patent No.: US 6,312,062 B1
(45) Date of Patent: Nov. 6, 2001

(54) BRAKE FLUID PRESSURE CONTROL DEVICE

(75) Inventor: Koichi Hashida, Itami (JP)

(73) Assignee: Sumitomo (SEI) Brake Systems, Inc., Hisai (JP)

(*) Notice: Subject to any disclaimer, the term of this patent is extended or adjusted under 35 U.S.C. 154(b) by 0 days.

(21) Appl. No.: 09/588,471

(22) Filed: Jun. 6, 2000

(30) Foreign Application Priority Data

Dec. 7, 1999 (JP) .................................................. 11-347227

(51) Int. Cl.[7] .............................. B60T 8/48; B60T 8/42
(52) U.S. Cl. ................................ 303/113.2; 303/116.1; 303/DIG. 11; 303/115.4
(58) Field of Search ............................ 303/115.5, 115.4, 303/115.1, 116.1, 116.2, 113.2, DIG. 11, 139, 140, 113.3, 119.2, 113.1, 900, 901, DIG. 1, DIG. 2

(56) References Cited

U.S. PATENT DOCUMENTS

| 5,368,374 | 11/1994 | Fujimoto . |
| 5,584,539 | * 12/1996 | Hashida ............................ 303/113.2 |
| 5,904,335 | 5/1999 | Oyama . |

FOREIGN PATENT DOCUMENTS

| 64-74153 | 3/1989 | (JP) . |
| 4-231241 | 8/1992 | (JP) . |
| 5-116607 | 5/1993 | (JP) . |
| 8-108838 | 4/1996 | (JP) . |
| 11-59377 | 3/1999 | (JP) . |

OTHER PUBLICATIONS

English Language Abstract of JP 11–59377.
Englissh Language Abstract of JP 8–108838.
English Language Abstract of JP 5–116607.

* cited by examiner

Primary Examiner—Douglas C. Butler
(74) Attorney, Agent, or Firm—Greenblum & Bernstein, P.L.C.

(57) ABSTRACT

A brake fluid pressure control device including a power pump provided in a fluid supply line for discharging fluid into the main fluid line. An on-off valve is provided in the main fluid line upstream of the point at which the outlet circuit of the pump merges with the main fluid line. A fluid reservoir is provided in the fluid supply line upstream of the pump. For automatic braking, a changeover valve is changed over to supply fluid in the first chamber into the inlet port of the pump. When the automatic braking is off, the inlet and outlet ports of the pump are connected to the second and first chambers of the reservoir, respectively, to supply fluid into the first chamber.

3 Claims, 5 Drawing Sheets

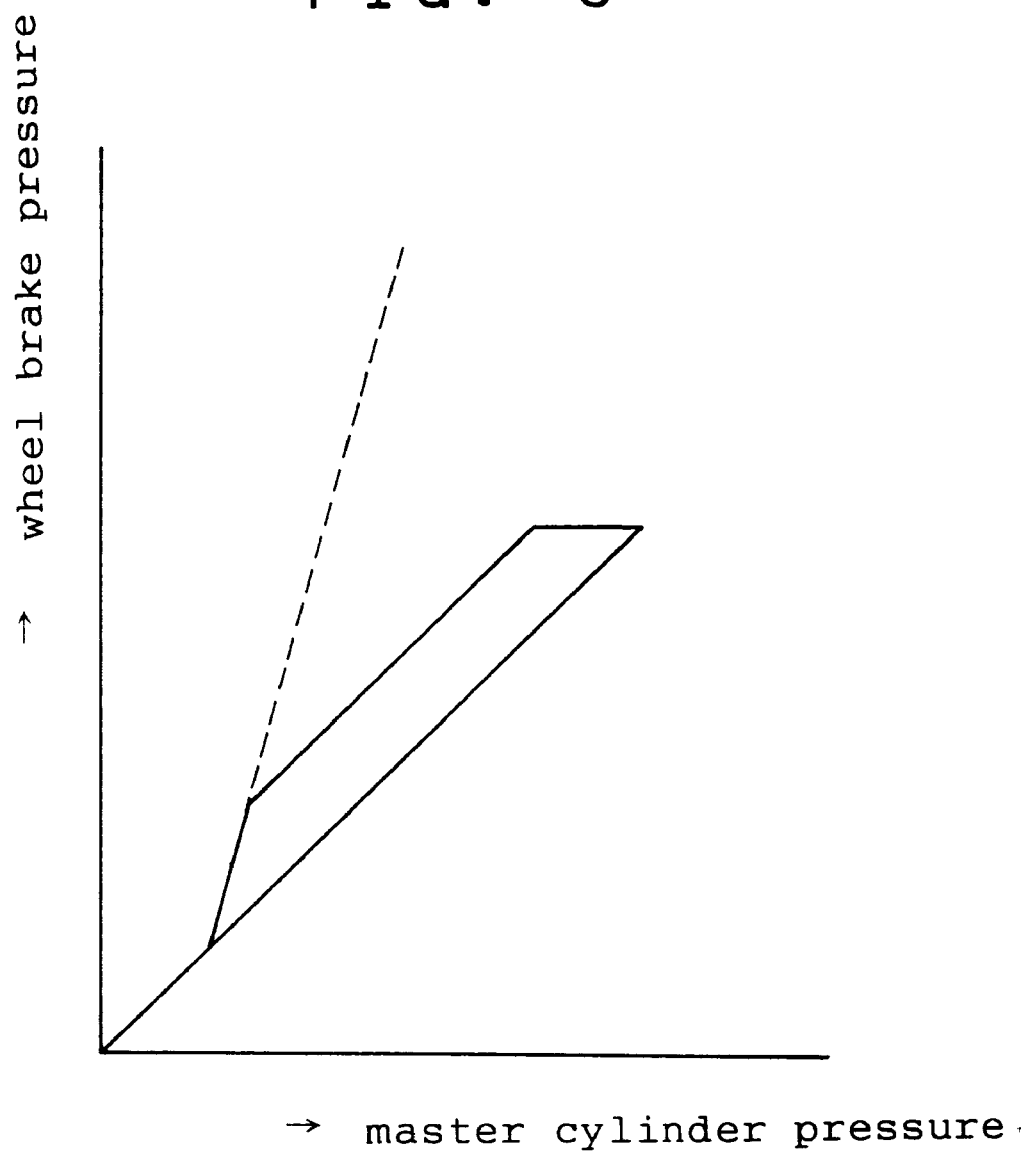

BRAKE FLUID PRESSURE CONTROL DEVICE

BACKGROUND OF THE INVENTION

This invention relates to an automotive brake fluid pressure control device that can perform automatic braking functions such as traction control and vehicle stability control.

For economical reasons, the most popular automotive antilock brake control systems are what is known as the circulation type, which has a wheel brake fluid pressure control valve unit including a discharge valve and provided in a main fluid line extending from a master cylinder to each wheel brake, a fluid reservoir for temporarily storing brake fluid discharged through the discharge valve, and a power pump for sucking fluid in the reservoir and returning it into the main fluid line.

Various braking systems have been proposed which are versions of the circulation type and can perform automatic braking such as traction control and vehicle stability control.

One of them is disclosed in Japanese patent publication 64-74153, which includes a main line, a fluid supply line and an on-off valve adapted to connect the fluid supply line to the main line only during traction control, and a pump provided in the fluid supply line for applying brake fluid to the wheel brake during traction control. The on-off valve opens only during traction control and otherwise kept shut. While the on-off valve is closed, there is no spare fluid in the fluid supply line. Thus, when traction control starts, brake fluid has to be sucked to the pump from the master cylinder reservoir through the master cylinder, brake piping, and the on-off valve. Thus, high suction resistance makes it impossible to apply brake fluid to the wheel brake quickly upon start of the traction control.

Japanese Patent Publication 5-116607 disclosed an improved brake fluid pressure control system, which was proposed to solve these problems.

This unit is basically a circulation type antilock brake control system with the following elements added: that is, a fluid supply line branching from the main fluid line at its point between the master cylinder and a fluid return point at which the line from the pump outlet merges: a discharged fluid reservoir provided at the end of the fluid supply line: an on-off valve for checking fluid flow from the fluid supply line to the discharged fluid reservoir during traction control: an intermediate fluid reservoir provided in the fluid supply line for supplying fluid during traction control.

The applicant of the present invention also proposed a system having a similar intermediate reservoir in unexamined Japanese patent publication 8-108838. In either of these systems, fluid can be more smoothly supplied to the pump inlet from the intermediate reservoir during automatic braking control than with a system without an intermediate reservoir. But since these reservoirs are both nonactive ones and thus fluid is sucked under the atmospheric pressure, it is difficult to smoothly supply fluid to the pump inlet so that the drake pressure can be increased with sufficient quickness necessary for vehicle stability control particularly when the ambient temperature is low and the fluid viscosity is high.

Japanese patent publication 4-231241 proposes to use a power-driven active pressure accumulator instead of the above-described (passive) fluid reservoir. Although such an active accumulator greatly improves the responsiveness and the fluid supply capability, such a system is naturally very costly because the accumulator needs an actuator and an actuator circuit.

Unexamined Japanese patent publication 11-59377 proposes a system having a means for storing fluid at a higher-than-atmopheric pressure. This system needs a sealing mechanism for maintaining the higher-than-atmospheric pressure.

One problem with this system is that failure of the sealing mechanism leads to leakage of fluid. This considerably increases the brake pedal stroke.

Also, it is practically impossible to completely prevent leak of brake fluid stored at a higher-than-atmospheric pressure. Thus, fluid tends to be lost gradually. One solution to this problem is the provision of means for restoring fluid during braking. But when this means is activated, the brake pedal stroke increases.

An object of the invention is to provide a brake fluid pressure control unit that has improved reliability and improved pedal feeling.

SUMMARY OF THE INVENTION

According to the invention, there is provided a brake fluid pressure control device for use in an automotive brake system including a master cylinder, a wheel brake, and a main fluid line connecting the master cylinder to the wheel brake, the device having an automatic braking function and comprising: a power pump having an inlet port connected to the main fluid line at a first point by a first fluid line, and a discharge port connected to the main fluid line at a second point between the first point and the wheel brake through a second fluid line; a fluid reservoir comprising a housing, a slider slidably mounted in the housing to liquid-tightly partition the interior of the housing into a first chamber and a second chamber, the second chamber communicating with the master cylinder, and a biasing element biasing the slider toward the first chamber; an on-off valve provided in the main fluid line between the first point and the second point; a changeover valve movable between a first position at which the inlet port and discharge port of the pump communicate with the first chamber of the reservoir and the main fluid line, respectively, and a second position at which the inlet and discharge ports of the pump communicate with the second and first chambers of the reservoirs, respectively; a control unit for closing the on-off valve and moving the changeover valve to the first position during an automatic braking mode to supply brake fluid to the pump, and otherwise opening the on-off valve and moving the changeover valve to the second position.

According to this invention, there is also provided a brake fluid pressure control device which comprises, instead of the changeover valve in the abovesaid device, a valve for opening the passage in the fluid reservoir when the slider has moved by a predetermined distance toward the second chamber, and otherwise closing the passage; an on-off valve provided in the fluid supply line between the fluid reservoir and the inlet port of the pump; a bypass line branching from the main fluid line at a third point between the first point and the first on-off valve and merging with the fluid supply line at a point between the fluid reservoir and the second on-off valve, the bypass line being provided with a check valve for allowing a fluid flow from the main fluid line toward the first chamber of the fluid reservoir and preventing a fluid flow from the fluid supply line toward the main fluid line; a pressure-responsive valve provided in the main fluid line between the first and third points for allowing a fluid flow from the master cylinder toward the wheel brake at all times, and restricting a fluid flow toward the master cylinder while the master cylinder pressure is higher than a predetermined level; and a control unit for opening the second on-off valve and closing the first on-off valve during the automatic braking mode to communicate the first chamber with the inlet port of the pump, and otherwise closing the second on-off valve and opening the first on-off valve to communicate the discharge port of the pump with the wheel brake.

According to this invention, there is also provided a brake fluid pressure control device wherein the pressure-responsive valve is a proportional pressure-reducing valve having an outlet port and an inlet port and adapted to transmit fluid pressure applied to the inlet port to the outlet port after reducing the pressure at a predetermined ratio, the outlet and inlet ports communicating with the master cylinder and the third point, respectively.

Other features and objects of the present invention will become apparent from the following description made with reference to the accompanying drawings, in which:

BRIEF DESCRIPTION OF THE DRAWINGS

FIG. 5 is a graph similar to FIG. 3 but for the master cylinder pressure and the wheel brake pressure of the third embodiment.

DETAILED DESCRIPTION OF THE PREFERRED EMBODIMENT

Figure 1:
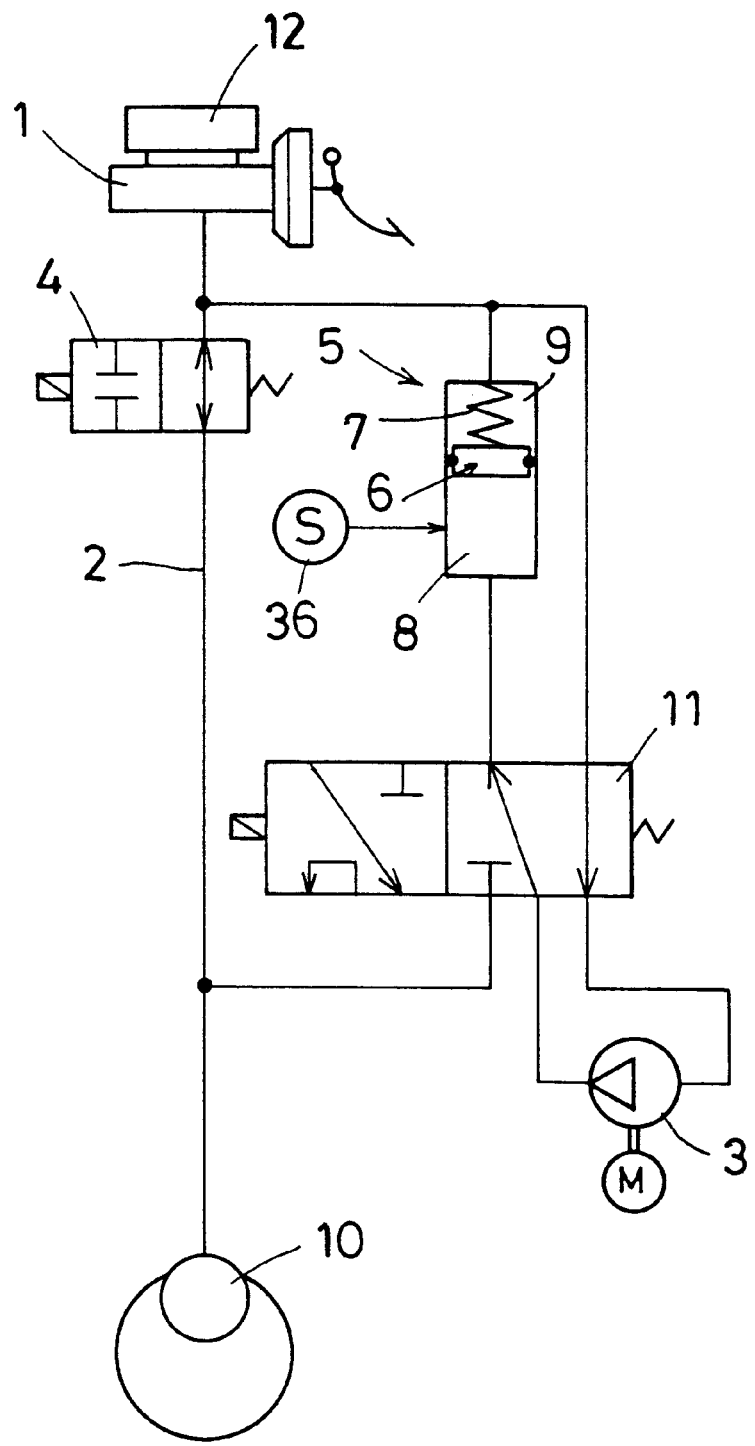
FIGS. 1 and 2 are circuit diagrams of brake fluid pressure control system of first and second embodiments of the invention, respectively.

FIG. 1 shows a brake fluid pressure control device of a first embodiment used in a vehicle brake system which has a master cylinder 1 and a main fluid line 2 connecting the master cylinder to each of four wheel brakes 10 (only one shown). The brake fluid pressure control device includes an electric pump 3, a fluid reservoir 5, and a normally open electromagnetic on-off valve 4 provided in the main fluid line 2 at its portion between the master cylinder 1 and a point at which a line from the outlet port of the pump 3 merges.

The reservoir 5 has a piston 6 which is slidably mounted in its housing and partitions the interior of the housing into a first chamber 8 and a second chamber 9. The second chamber is always in communication with the master cylinder 1. A spring 7 is mounted in the second chamber 9 to bias the piston 6 toward the first chamber 8 with a constant force.

The reservoir 5, pump 3 and main fluid line 2 are selectively connected to and disconnected from one another by an electromagnetic changeover valve 11. Specifically, when the valve 11 is in the position shown in FIG. 1, the outlet and inlet ports of the pump 3 communicate with the first and second chambers 8 and 9, respectively. When the valve 11 is in the other position, the outlet and inlet ports of the pump 3 communicate with the main fluid line 2 and the first chamber 8, respectively. In the latter position, the connection to the second chamber 9 is broken.

Though not shown, the pump 3 has built-in check valves for checking reverse fluid flow at the inlet and outlet ports, respectively.

Instead of the single 5-port valve 11 as shown, 3-port and 2-port valves may be combined to perform the 2-position, 5-port function. A position sensor 36 is provided to detect the position of the piston 6. It may be a magnetic lead switch for detecting the magnetic field produced by a magnet attached to the piston 6, or a known non-contact type position sensor.

The operation of the device of FIG. 1 will be described below. In FIG. 1, when the first chamber 8 of the fluid reservoir 5 is filled with brake fluid, the piston 6 is biassed by the spring 7, so that the fluid pressure in the first chamber 8 is kept higher than the fluid pressure in the second chamber 9, that is, the pressure of the master cylinder by an amount corresponding to the force of the spring 7, irrespectively of whether the brake pedal is tredded or not.

If in the state of FIG. 1, the fluid pressure in the first chamber 8 drops as a result of slight leakage of fluid in the first chamber 8 into the second chamber 9 through the gap around the piston 6 and the spring 7 is stretched, the sensor 36 detects this fact from the position of the piston 6, and a control unit (not shown) activates the pump 3 to supply fluid into the first chamber 8 until the spring 7 is compressed to the predetermined degree.

When the brake pedal is depressed in this state, the piston 6 will never move because the rise in the master cylinder pressure is equally applied to the first and second chambers and because no air is present in the first chamber 8 which is completely sealed. Thus, the pedal stroke remains stable.

For automatic braking, the on-off valve 4 is closed, and the changeover valve 11 is changed over, and the pump 3 is activated. As soon as the valve 11 is changed over, the spring 7 pushes the piston 6 toward the first chamber 8 to forcibly push fluid out of the first chamber 8 into the inlet port of the pump 3 and at the same time. Thus, even though the master cylinder 1 is usually not pressurized during automatic brake control, fluid can be quickly drawn into the second chamber 9 from a master cylinder reservoir 12. Also, fluid in the first chamber 8 can be quickly supplied to the inlet port of the pump 3 even if the fluid temperature is low and thus the fluid viscosity is high. Thus, the pump 3 can quickly discharge fluid into the main fluid line, so that the brake fluid pressure will increase quickly. Also, since fluid is quickly drawn into the second chamber 9, when the brake pedal is depressed subsequently, the piston 6 will never move, so that the pedal stroke will not increase.

Figure 2:
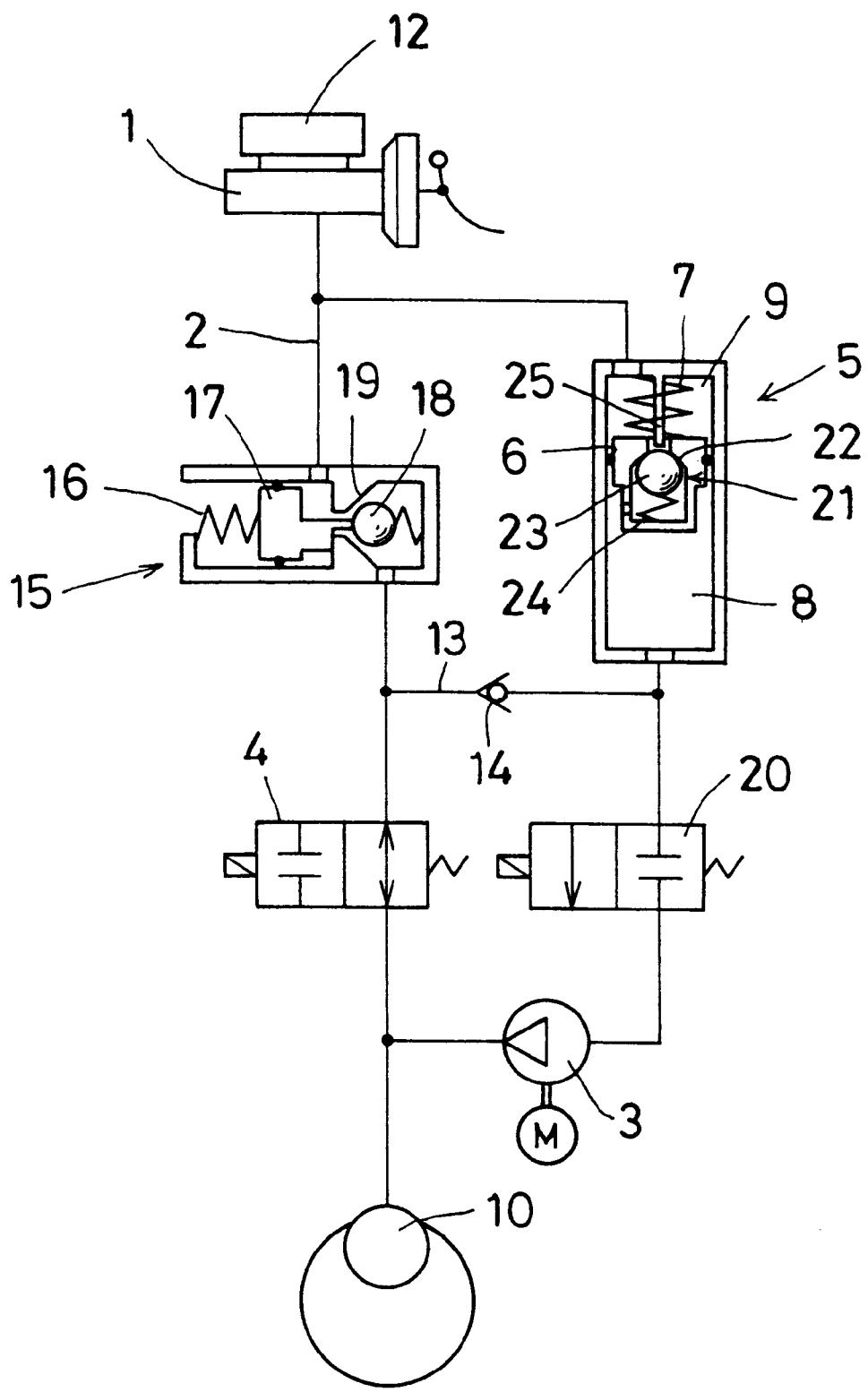

FIG. 2 shows a second embodiment. Elements 1–4, 6–10 and 12 are not described because they are exactly the same as the corresponding elements in the first embodiment of FIG. 1. The fluid reservoir 5' of this embodiment slightly differs from the reservoir 5 in FIG. 1.

The device of FIG. 2 has a bypass line 13 branching from the main fluid line 2 to the first chamber 8 of the reservoir 5'. A check valve 14 that passes only a fluid flow from the main fluid line 2 toward the first chamber 8 is provided in the bypass line 13.

A pressure-responsive valve 15 is provided in the main fluid line 2 between the point at which the line 13 branches and the point at which the line leading to the reservoir 5 branches. The valve 15 comprises a valve ball 18 received in a first chamber of a housing of the valve and biassed toward a valve seat 19 by a weak spring, and a piston 17 slidably mounted in a second chamber of the housing and biassed toward the valve ball 18 by a spring 16 to keep the ball 18 out of contact with the seat 19 as shown.

Thus, while the master cylinder pressure is below a predetermined level, the valve 15 permits a fluid flow in either direction. The force of the spring 16 is determined such that the piston 17 is moved leftwardly in FIG. 2 against the force of the spring 16 until the ball 18 gets seated on the valve seat 19 when the master cylinder pressure rises to a predetermined level. Now the valve 15 permits only a fluid flow from the master cylinder 1 toward the on-off valve 4.

A normally closed electromagnetic on-off valve 20 is provided in the line connecting the first chamber 8 of the reservoir 5' to the inlet port of the pump 3. In the automatic braking mode, it is opened to communicate the first chamber 8 with the pump 3. In the non-automatic braking mode, it is closed to accumulate the brake fluid in the first chamber 8. Thus the valve 20 performs part of the functions of the changeover valve 11 in the first embodiment shown in FIG. 1.

The reservoir 5' has a valve 21 actuated by the piston 6 and comprising a valve seat 22 formed inside the piston 6, a ball 23 mounted in the piston 6, a spring 24 biasing the ball 23 toward the valve seat 22, and a pushrod 25 provided in the second chamber 9. When the first chamber 8 is fully filled so that the piston 6 is moved upwardly, the ball 23 is pushed by the pushrod 25 and separates from the seat 22 to open the valve 21.

The operation of the device of FIG. 2 will be described below.

When the brake pedal is depressed and the master cylinder pressure has exceeded the abovementioned predetermined level, the piston 17 of the valve 15 moves leftwardly under the master cylinder pressure. But since the force of the spring biasing the ball 18 is weak, the ball is separated from the seat 19 under the master cylinder pressure. Thus, brake fluid from the master cylinder 1 can flow through the valve 15 toward the wheel brake 10.

When the brake pedal is released, the master cylinder pressure drops, so that the pressure in the line between the valve 15 and the wheel brake 10 exceeds the master cylinder pressure. So the brake fluid at the brake side tends to return to the master cylinder 1. But since the ball 18 seats on the valve seat 19 at this time, the valve 15 is kept shut. Thus the brake fluid cannot flow through the valve 15 back to the master cylinder 1.

When the master cylinder pressure further drops and the fluid pressure in the first chamber 8 becomes greater than the combined force of the spring 7 and the fluid pressure in the second chamber 9, the piston 6 is pushed upwardly in FIG. 2, while drawing fluid into the chamber 8 through the bypass line 13. When the piston 6 is moved a predetermined distance, the valve 21 open, so that the first chamber 8 communicates with the second chamber 9. Thus excess brake fluid will flow through the second chamber 9 and go back to the master cylinder 1.

Figure 3:
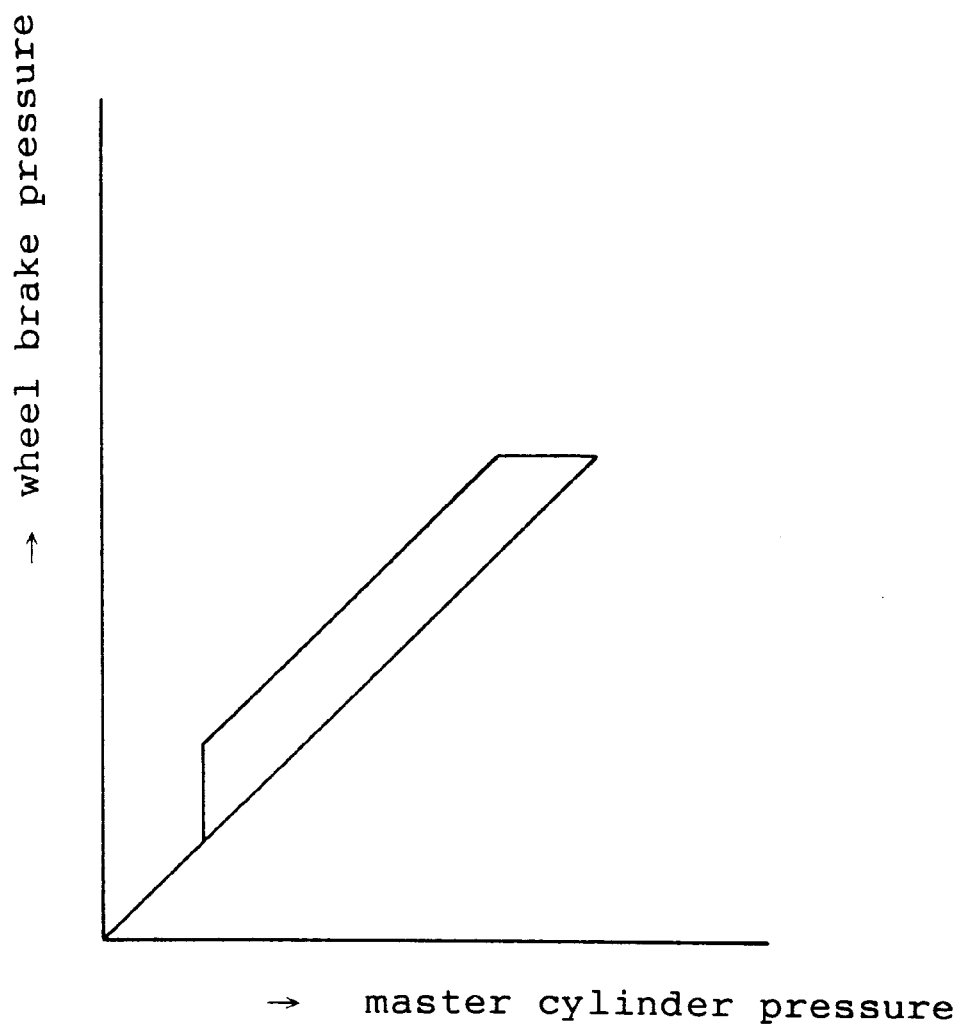
FIG. 3 is a graph showing the relationship between the master cylinder pressure and the wheel brake pressure in the second embodiment.

As the master cylinder pressure further drops, the valve 15 now opens, so that the wheel brake pressure becomes equal to the master cylinder pressure as shown by the vertical portion of the line of FIG. 3. Although a difference is produced between the master cylinder pressure and the wheel brake pressure when the brake is released, fluid scarcely moves in the brake lines as in the embodiment of FIG. 1, though the piston 6 moves. Thus, even though a small amount of fluid moves with the actuation of the valve 15 (or the displacement of the piston 17), the relationship between the pedal stroke and the wheel brake pressure is substantially the same as with a conventional brake system. Thus, the pedal feeling can be kept good.

For automatic braking, the on-off valve 4 is closed and the valve 20 is opened and the pump 3 is activated. The operation in automatic braking is the same with the embodiment of FIG. 1.

Figure 4:
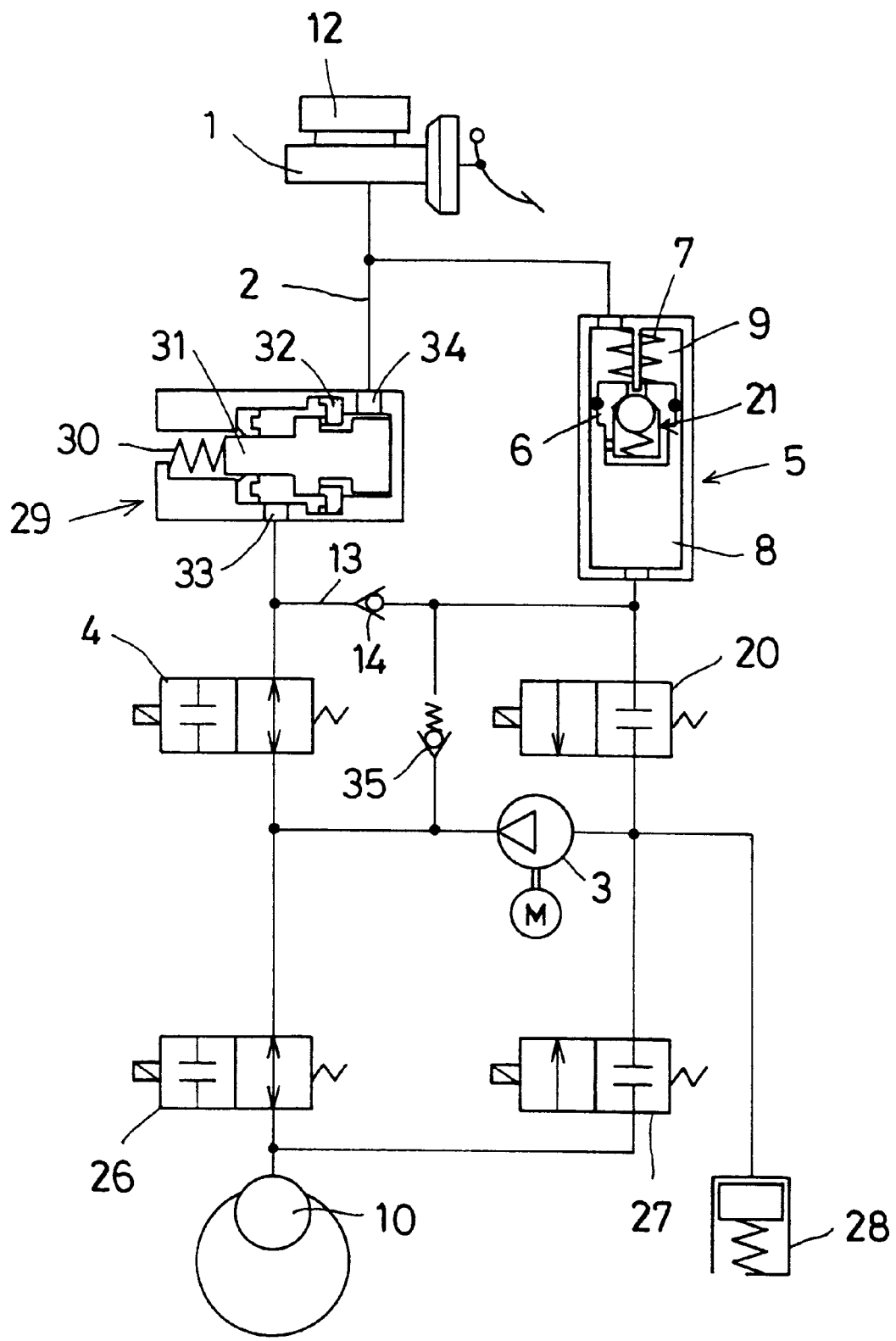
FIG. 4 is a circuit diagram of a third embodiment.

FIG. 4 shows a third embodiment, which has the antilock brake control function besides the automatic braking function.

Elements 1–10 and 12 are equivalent to the corresponding elements in FIGS. 1 and 2.

The bypass line 13 having the check valve 14, the on-off valves 20, and valve 21 are also the same as in the embodiment of FIG. 2. Thus these elements are not described again.

The device of FIG. 4 includes an inlet valve 26, an outlet valve 27 and a discharged fluid reservoir 28, which are widely used in a conventional antilock brake control system.

Also, instead of the pressure-responsive valve 15 of FIG. 2, a known proportional pressure-reducing valve 29 (which also serves as a pressure-responsive valve) used for proper distribution of the braking force to the rear wheels is provided in the main fluid line 2.

The valve 29 shown comprises a housing having an inlet port 33 and an outlet port 34, a plunger 31 slidably mounted in the housing and biased by a spring 30, and a lip seal 32 adapted to come into and out of contact with the plunger 31. It reduces the fluid pressure from the inlet port 33 at a predetermined rate and leads the reduced pressure to the outlet port 34.

This type of valve is ordinarily mounted in a brake system with its inlet port 33 connected to the line leading to the master cylinder and its outlet port 34 to the line leading to the wheel brake 10 to distribute braking forces to the four vehicle wheels in an optimum manner. But according to the present invention, the valve 29 is arranged in an opposite way, that is, with the inlet port 33 connected to the line leading to the wheel brake 10 and the outlet port 34 to the line leading to the master cylinder 1. With this arrangement, fluid from the master cylinder can always flow freely through the valve 29 into the line leading to the wheel brake 10.

On the other hand, while the master cylinder pressure is over the pressure at point B, the valve 29 prevents reverse flow from the wheel brake 10 toward the master cylinder until the master cylinder pressure decreases to such a level that the master cylinder pressure is at a predetermined ratio with respect to the wheel brake pressure. Once the predetermined ratio is reached, the valve 29 allows reverse flow from the wheel brake 10 toward the master cylinder 1. When the master cylinder pressure drops below the point B, fluid can now freely flow through the valve 29 in either direction. From the above description, it will be apparent that the valve 29 of FIG. 4 can be used as a substitute for the valve 15 in FIG. 2. Numeral 35 indicates a relief valve.

The operation of the device of FIG. 4 is described.

When the brake pedal is depressed, brake fluid flows through the valve 29 toward the wheel brake 10. When the master cylinder pressure exceeds the point B in the graph of FIG. 5, the plunger 31 is moved leftwardly in the figure under the master cylinder pressure until its head is seated on the lip seal 32. Thus, fluid cannot flow from the inlet port 33 to outlet port 34. But fluid can flow from the outlet port 34 to inlet port 33 through a passage formed around the lip seal 32. Thus the fluid pressure is supplied from the master cylinder 1 to the wheel brake 10.

When the brake pedal is released, the passage between the plunger 31 and the lip seal 32 and the passage around the lip seal are both closed, so that fluid cannot flow through the valve 29 toward the master cylinder 1. Thus, fluid in the line between the valve 29 and the wheel brake 10 flows through the line 13 into the first chamber 8 of the reservoir 5. Exactly as described with respect to FIG. 2, excess fluid flows through the second chamber 9 back to the master cylinder.

When the master cylinder pressure further reduces until the predetermined pressure-reducing ratio is reached, the proportional pressure-reducing valve 29 is activated to reduce the wheel brake pressure while keeping the predetermined pressure-reducing ratio, as shown by the inclined line aligned with the chain line in the graph of FIG. 5. When the wheel brake pressure become equal to the master cylinder pressure, the valve portion in the proportional valve 29 opens fully.

The inclined line means that the wheel pressure decreases gradually until it becomes equal to the master cylinder pressure. On the other hand, in the arrangement of FIG. 2, the wheel brake pressure suddenly drops to the level equal to the master cylinder pressure as is apparent from the vertical line in FIG. 3. Thus, the device of FIG. 4 using a proportional pressure-reducing valve is more desirable than the device of FIG. 2 in that it can improve the pedal feeling.

For automatic braking, as with the device of FIG. 2, the pump 3 is activated with the on-off valves 4 and 20 closed and opened, respectively.

For antilock brake control, with the on-off valves 4 and 20 opened and closed, respectively, the inlet valves 26 and outlet valve 27 are individually and selectively opened and closed for pressure reduction, reincrease and holding. Brake fluid for pressure reincrease is supplied by activating the pump 3.

Even during the automatic braking mode, if the brake pedal is depressed, the valve 27 is opened and the valve 26 is closed so that the master cylinder pressure is transmitted to the wheel brake through the valve 29, line 13 and valves 20, 27. In this state, even though the pump 3 keeps discharging fluid into the line between the valves 4 and 26, which are both closed in this state, the pressure in this line will not rise excessively, because excess fluid pressure is released through the relief valve 35. Since fluid is brought back into the first chamber 8 through the relief valve 35, it is possible to reliably supply brake fluid in a sufficient amount for subsequent automatic braking.

The three embodiments described above may be combined or otherwise modified in various ways. For example, the function of supplying brake fluid into the first chamber 8 from the pump, as used in the device of FIG. 1, may be added to the device of FIGS. 2 or 4. Also, the inlet valve 26 and outlet valve 27 used in the device of FIG. 4 may be added to the device of FIGS. 1 or 2 to add the antilock function.

Instead of the valve 29 shown in FIG. 4, any other type of known proportional pressure-reducing valve may be used.

According to the present invention, even if a small amount of fluid leaks from the first chamber into the second chamber, it is compensated for by replenishing into the second chamber. Thus the total volume of brake fluid in the first and second chamber will not change, so that there is no need to replenish fluid from the master cylinder. This stabilizes the brake pedal stroke.

In the embodiments of FIGS. 2 and 4, when the brake pedal is released, fluid is supplied into the first chamber through the bypass line, so that the first chamber is filled with a sufficient amount of fluid even if a small amount of fluid leaks from the first chamber.

In the embodiment of FIG. 4, the proportional pressure-reducing valve eliminates any sharp change in fluid pressure with brake release and thus improves pedal feelings.

What is claimed is:

1. A brake fluid pressure control device for use in an automotive brake system including a master cylinder, a wheel brake, and a main fluid line connecting the master cylinder to the wheel brake, said device having an automatic braking function and comprising:

a power pump having an inlet port connected to the main fluid line at a first point by a first fluid line, and a dishcarge port connected to the main fluid line at a second point between the first point and the wheel brake through a second fluid line;

a fluid reservoir comprisiong a housing, a slider slidably mounted in said housing to liquid-tightly partition the interior of said housing into a first chamber and a second chamber, said second chamber communicating with said master cylinder, and a biasing element biasing said slider toward said first chamber;

an on-off valve provided in the main fluid line between said first point and said second point;

a changeover valve movable between a first position at which the inlet port and discharge port of said pump communicate with said first chamber of said reservoir and the main fluid line, respectively, and a second position at which the inlet and discharge ports of said pump communicate with the second and first chambers of said reservoirs, respectively;

a control unit for closing said on-off valve and moving said changeover valve to said first position during an automatic braking mode to supply brake fluid to said pump, and otherwise opening said on-off valve and moving said changeover valve to said second position.

2. A brake fluid pressure control device for use in an automotive brake system including a master cylinder, a wheel brake, and a main fluid line connecting the master cylinder to the wheel brake, said device having an automatic braking function and comprising:

a fluid supply line branching from said main fluid line at a first point and merging with said manin fluid line at a second point;

a power pump provided in said fluid supply line and having inlet and outlet ports arranged so as to discharge fluid toward said second point;

a first on-off valve provided in said main fluid line between said second point and said master cylinder;

said first on-off valve being closed to supply brake fluid from said pump to said wheel brake during automatic braking mode;

a fluid reservoir provided in said fluid supply line between said first point and said pump for supplying brake fluid to said pump, said fluid reservoir comprising a housing, a slider slidably mounted in said housing to liquid-tightly partition the interior of said housing into a first chamber connected to the inlet port of said pump and a second chamber communicating with said master cylinder, said slider being formed with a passage through which said first and second chambers communicate with each other, a biasing element biasing said slider toward said first chamber, and a valve for opening said passage when said slider has moved by a predetermined distance toward said second chamber, and other wise closing said passage;

a second on-off valve provided in said fluid supply line between said fluid reservoir and said inlet port of said pump;

a bypass line branching from said main fluid line at a third point between said first point and said first on-off valve and merging with said fluid supply line at a point between said fluid reservoir and said second on-off valve, said bypass line being provided with a check valve for allowing a fluid flow from said main fluid line toward said first chamber of said fluid reservoir and preventing a fluid flow from said fluid supply line toward said main fluid line;

a pressure-responsive valve provided in said main fluid line between said first and third points for allowing a fluid flow from said master cylinder toward said wheel brake at all tiomes, and restricting a fluid flow toward said master cylinder while the master cylinder pressure is higher than a predetermined level; and a control unit for opening said second on-off valve and closing said first on-off valve during the automatic braking mode to communicate said first chamber with said inlet port of said pump, and otherwise closing said second on-off valve and opening said first on-off valve to communicate said discharge port of said pump with said wheel brake.

3. The device as claimed in claim 2 wherein said pressure-responsive valve is a proportional pressure-reducing valve having an outlet port and an inlet port and adapted to transmit fluid pressure applied to said inlet port to said outlet port after reducing the pressure at a predetermined ratio, said outlet and inlet ports communicating with the master cylinder and said third point, respectively.

* * * * *

UNITED STATES PATENT AND TRADEMARK OFFICE
CERTIFICATE OF CORRECTION

PATENT NO. : 6,312,062 B1
DATED : November 6, 2001
INVENTOR(S) : K. Hashida

It is certified that error appears in the above-identified patent and that said Letters Patent is hereby corrected as shown below:

Column 8,
Line 57, "other wise" should be -- otherwise --.

Column 9,
Line 6, "tiomes" should be -- times --.

Signed and Sealed this

Fourth Day of June, 2002

*Attest:*

JAMES E. ROGAN
*Director of the United States Patent and Trademark Office*

*Attesting Officer*